United States Patent [19]
Conta et al.

[11] 3,723,694
[45] Mar. 27, 1973

[54] MACHINE FOR CHECKING AND CORRECTING ELEMENTS OF HYBRID INTEGRATED CIRCUITS BY MEMORIZING DATA

[75] Inventors: Renato Conta; Giuseppe Mariani, both of Ivrea, Italy

[73] Assignee: Ing. C. Olivetti & C., S.p.A., (Turin), Italy

[22] Filed: Mar. 22, 1971

[21] Appl. No.: 126,604

[30] Foreign Application Priority Data

Mar. 20, 1970 Italy..................................67941 A/70
Apr. 30, 1970 Italy..................................68495 A/70

[52] U.S. Cl.................................219/69 V, 219/69 M
[51] Int. Cl..............................B23p 1/08, B23p 1/12
[58] Field of Search..........................219/69 M, 69 V

[56] References Cited

UNITED STATES PATENTS

| 3,596,039 | 7/1971 | Edmund | 219/69 M |
| 3,486,221 | 12/1969 | Robinson | 219/69 M X |
| 3,335,255 | 8/1967 | Ebersole et al. | 219/69 V |
| 2,079,310 | 5/1937 | Bennett | 219/69 V X |
| 3,333,080 | 7/1967 | De Vries | 219/69 M |
| 3,475,578 | 10/1969 | Vasiliev et al. | 219/69 V |

Primary Examiner—R. F. Staubly
Attorney—Harold J. Birch et al.

[57] ABSTRACT

A machine for checking and trimming circuit elements, for example resistive elements of hybrid integrated circuits produced by depositing thin film on a plate, is formed of separate stations. In a first station a checking device measures sequentially all elements and records the measurement on a memory. The records are evaluated to establish whether the integrated circuit is to be trimmed or not. If it is to be trimmed, in a second station a trimming tool is automatically brought in correspondence with the specific element to be trimmed and operates alternately with a device for comparing the element with a specimen, until the element falls within a certain range of tolerance.

24 Claims, 18 Drawing Figures

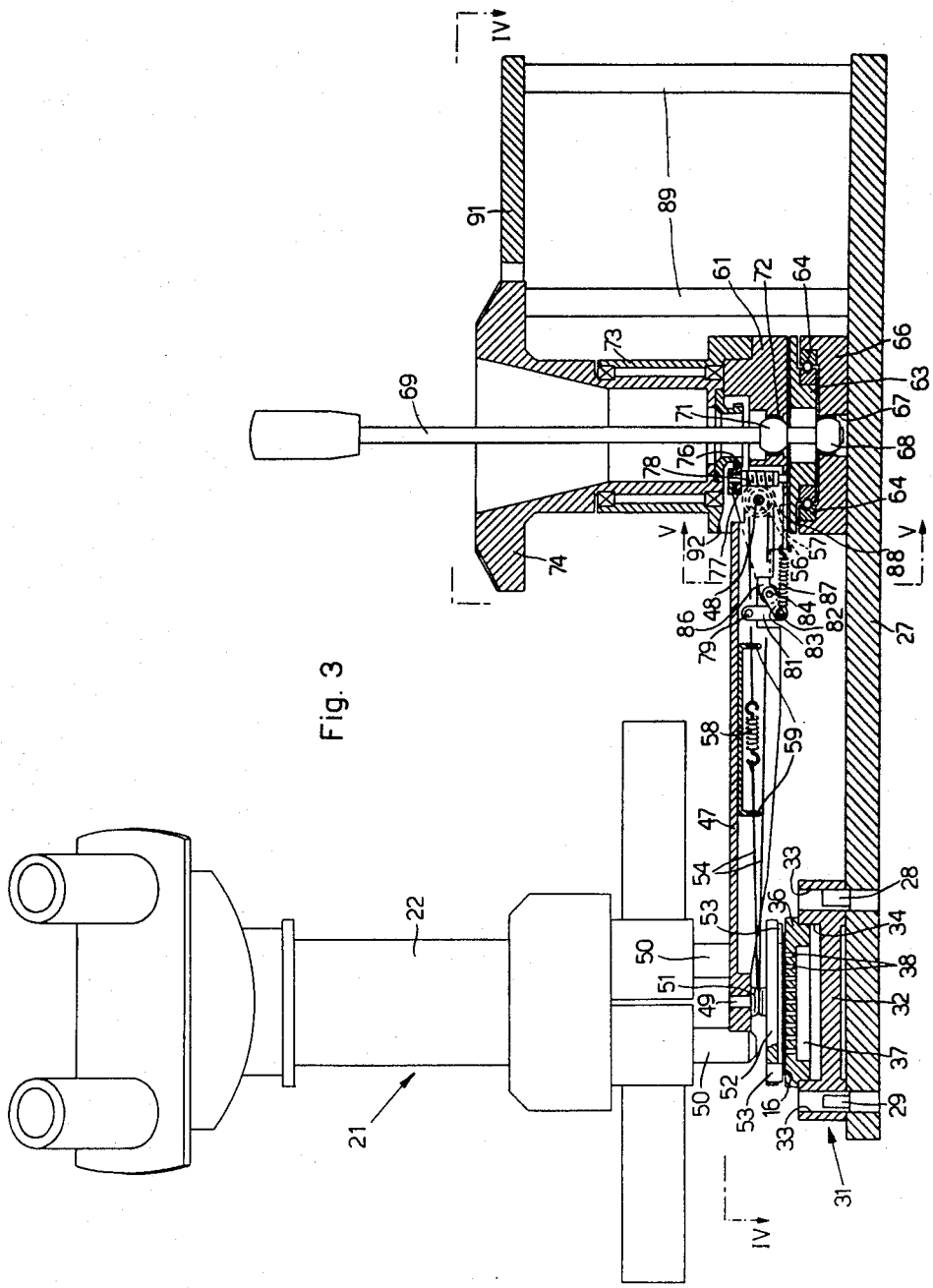

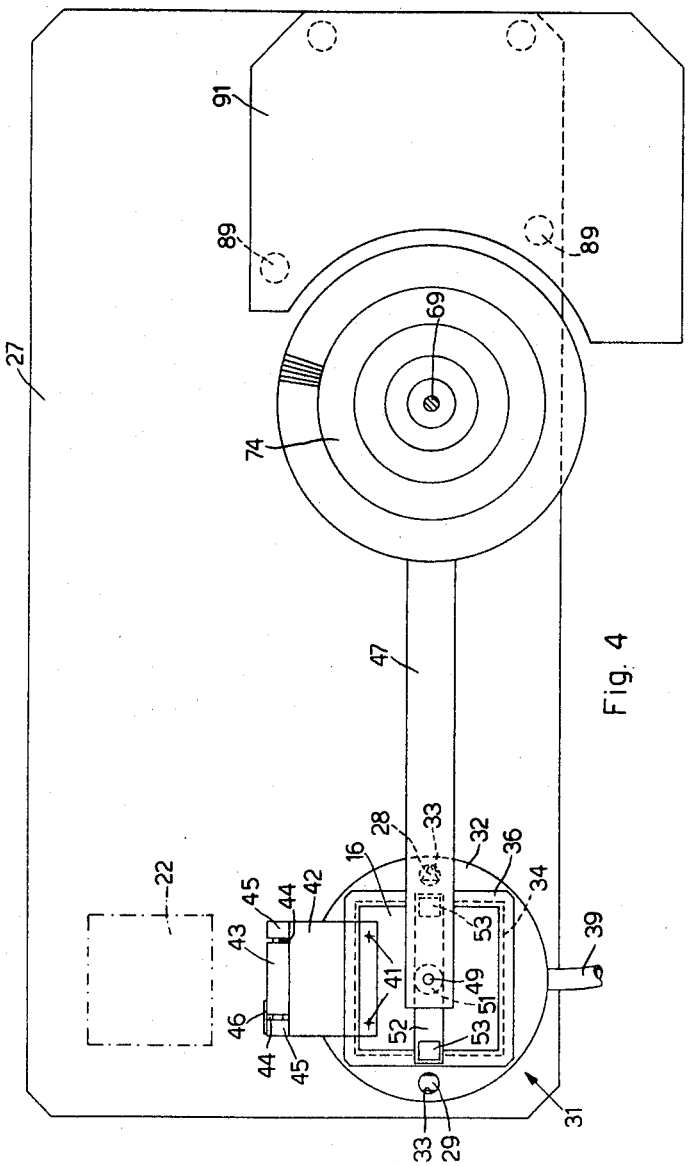
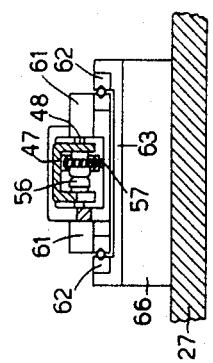

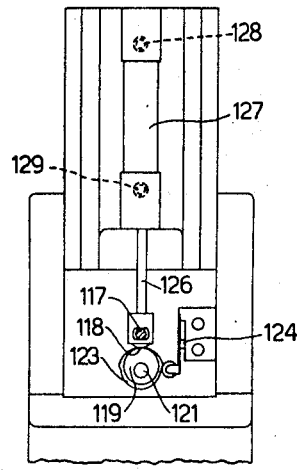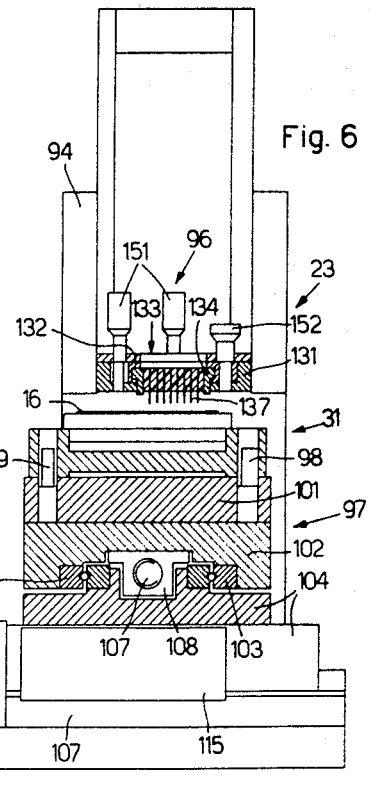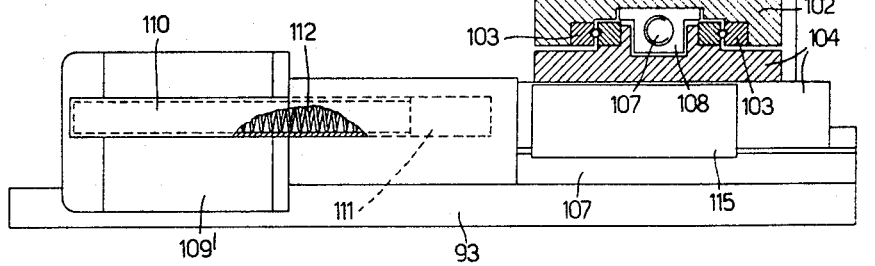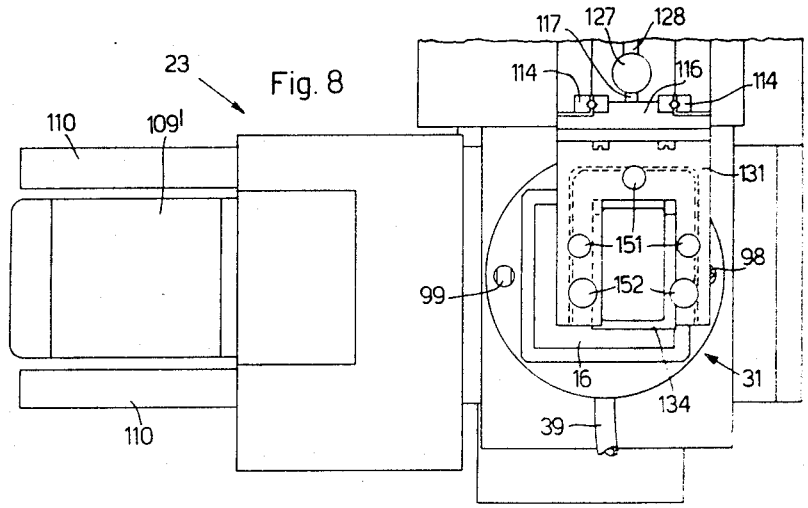

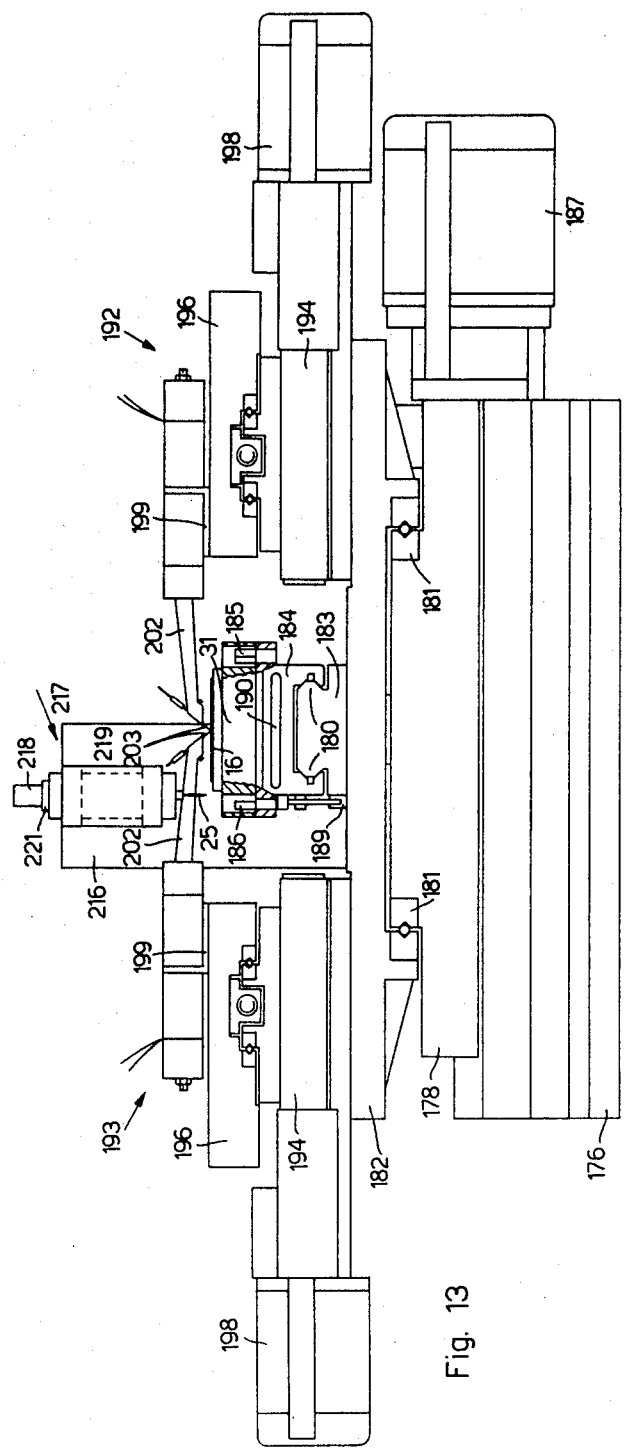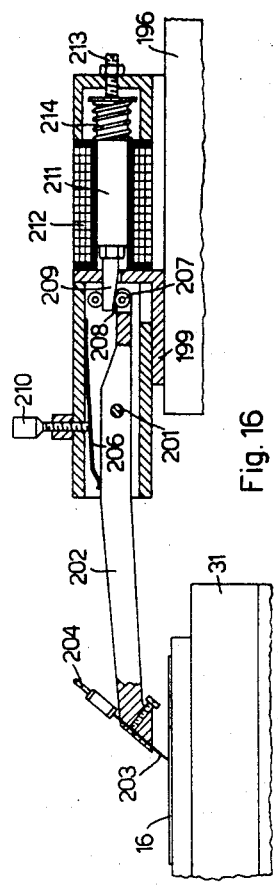

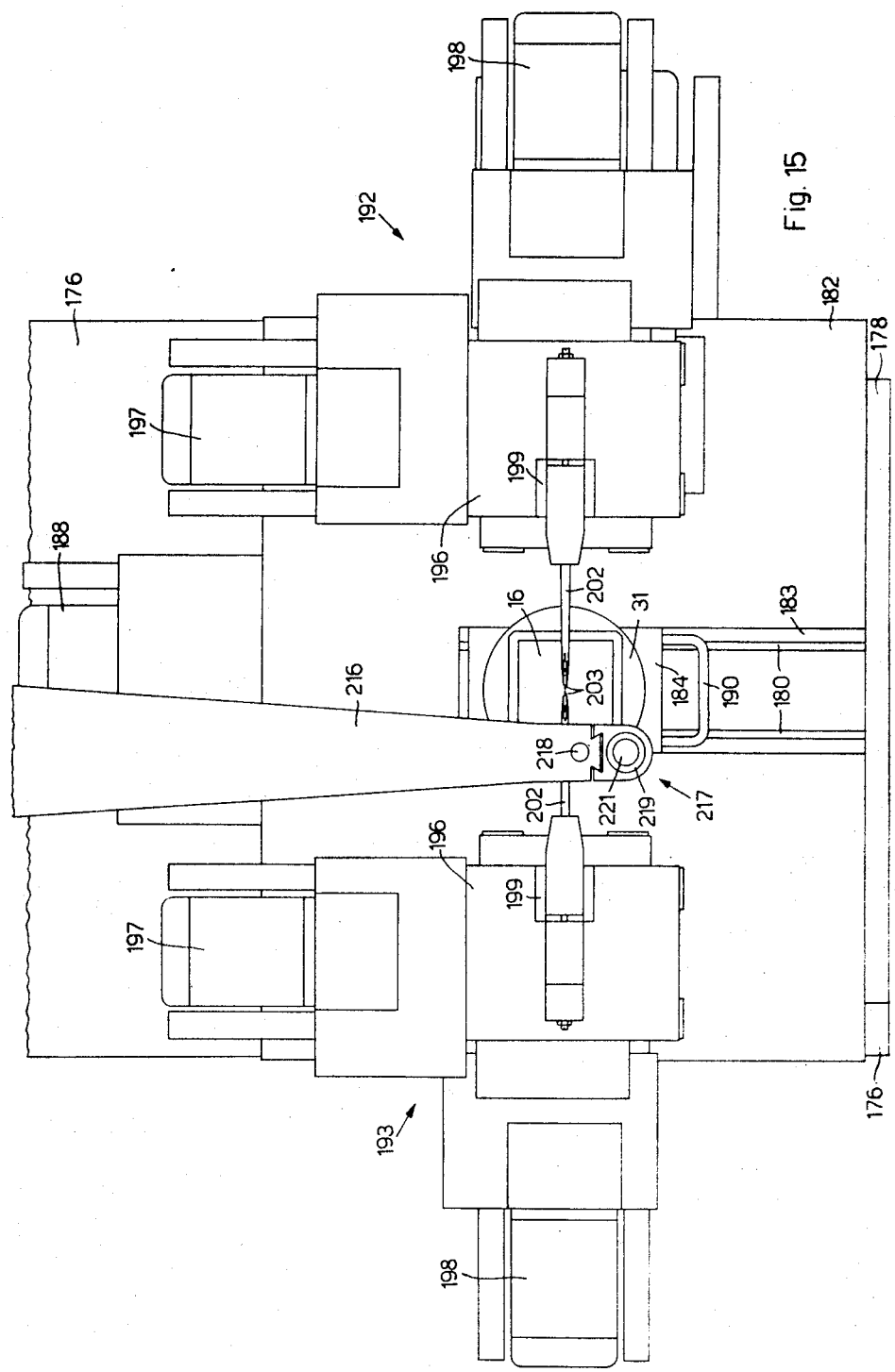

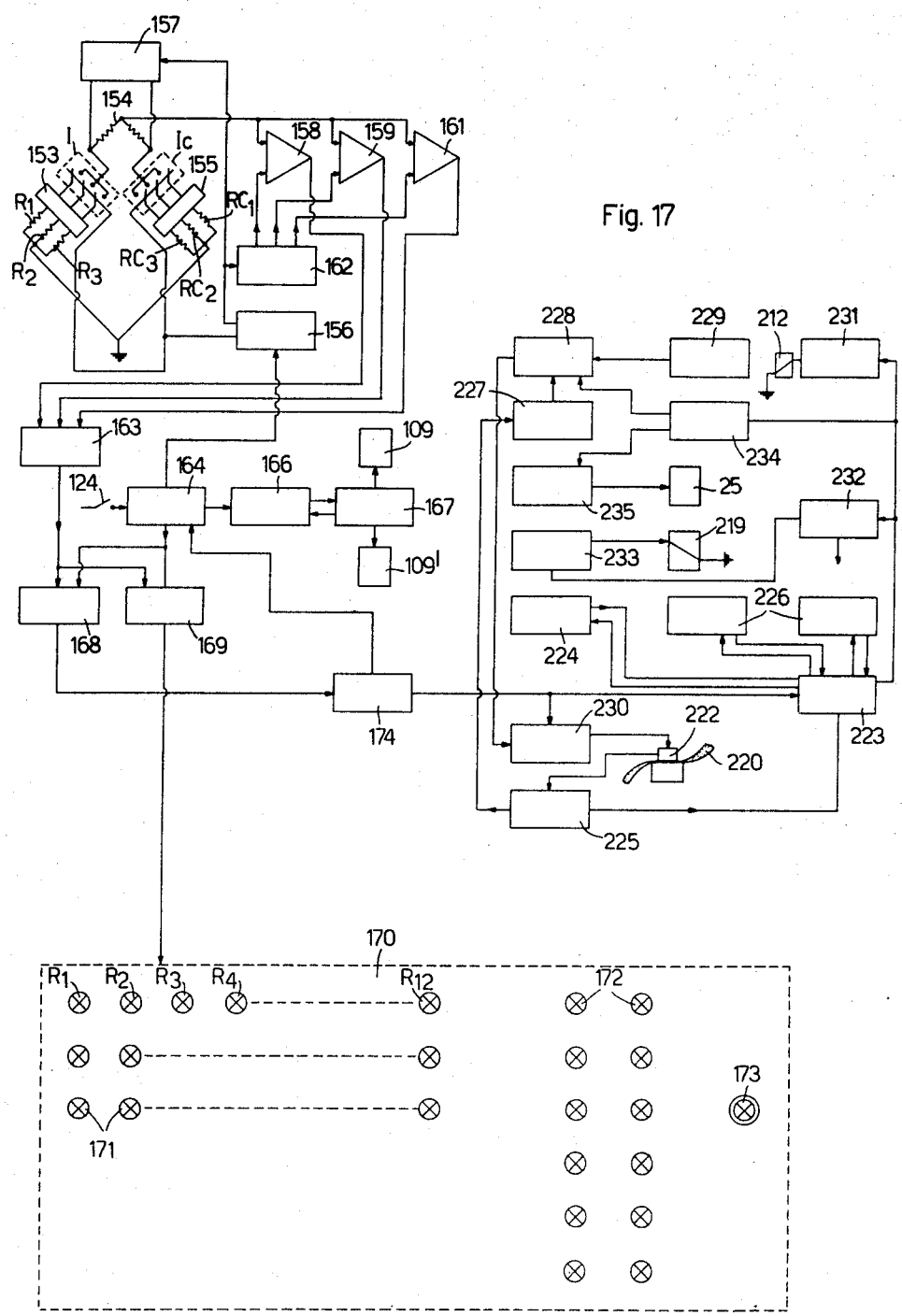

MACHINE FOR CHECKING AND CORRECTING ELEMENTS OF HYBRID INTEGRATED CIRCUITS BY MEMORIZING DATA

BACKGROUND OF THE INVENTION

The present invention relates to a machine for checking and correcting elements of hybrid integrated circuits produced by the deposition of thin films on supporting wafers, comprising correction means adapted to effect the correction by removal of part of the thin film.

The nature and geometry of integrated circuits necessitate long and extremely precise manufacturing operations. For example, checking of the values of resistors must be effected individually with very precise measuring apparatus. Moreover, the deposition of the thin film is difficult to gauge, especially as regards thickness, for which reason the value of the resistors is frequently outside the required tolerance limits. In order to avoid excessive numbers of rejects, it has already been proposed that resistors of excessive value be corrected by removal of part of the thin film. Even this operation is very laborious and delicate, since it must be effected on a single resistor by positioning it with the aid of microscopes, while the resistor corrected in this way must then be checked again by the measuring apparatus.

Moreover, the development of integrated circuits requires production methods which are automated as much as possible and these methods cannot be achieved with known apparatus.

The technical problem that the invention proposes to solve is that of producing a machine capable of effecting the checking and correction of the circuit elements in the most automatic manner possible.

This technical problem is solved by the machine according to the invention, which is characterized by measuring means adapted to effect the measurement of the element to be corrected substantially during the actuation of said correction means, said measuring means being adapted to control the actuation of said correction means.

According to another characteristic of the invention, the machine comprises a measuring device adapted to measure the elements to be corrected and to store the tolerance value condition, value to be corrected and non-correctable value.

In the case of a wafer holding a plurality of integrated circuit chips, a store is adapted to store the tolerance value condition and value to be corrected for each element of a chip in which there are no elements to be rejected, said correction being strictly limited to the elements to be corrected only.

According to another characteristic of the invention, the machine comprises a device for positioning a wafer to be checked and corrected on a support, said support being hollow and being connected to a vacuum intake for the fixing of said wafer on the support, said support being adapted to be arranged in said measuring device and in said correction device by the aid of pins.

These characteristics and other characteristics of the invention will become clear from the following description of a preferred embodiment given by way of example, but without restriction, with the aid of the accompanying drawings, in which:

FIG. 3 is a front view, partly in section and on a larger scale, of a first device of the machine;

FIG. 4 is a section on the line IV—IV of FIG. 3;

FIG. 5 is a partial section on the line V—V of FIG. 3;

FIG. 6 is a front view, partly in section and on a larger scale, of a second device of the machine;

FIG. 8 is a plan view of a detail of the device of FIG. 6;

FIG. 9 is a section on the line IX—IX of FIG. 7;

FIG. 13 is a front view, partly in section and on a larger scale, of a third device of the machine;

FIG. 15 is a plan view of the device of FIG. 13;

FIG. 16 is a view of a detail of the device of FIG. 13 on a further enlarged scale;

FIG. 17 is a block diagram of the electronic controller of the machine;

INTRODUCTION

Figure 18:
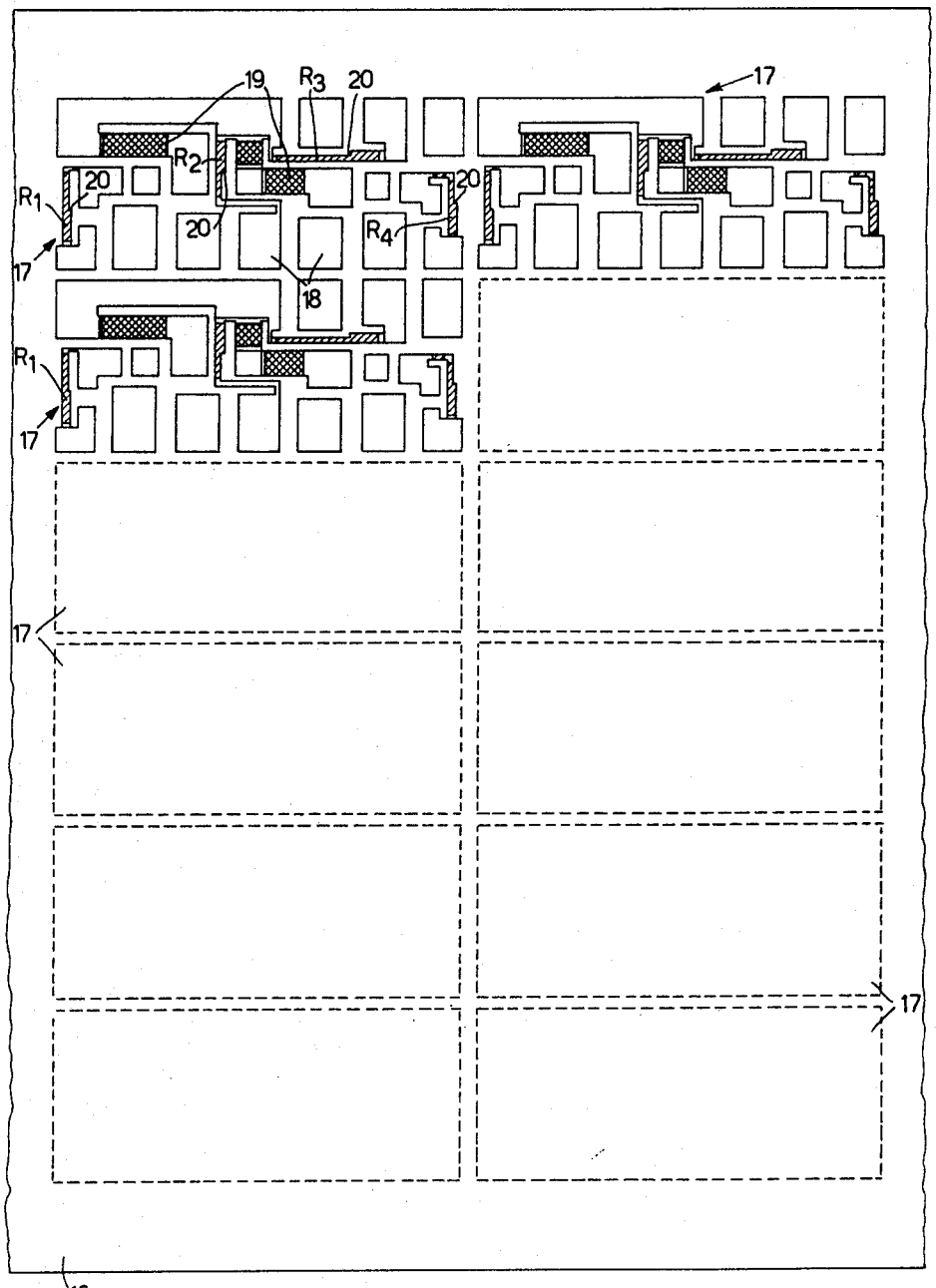
FIG. 18 is a view on a larger scale of an integrated circuit the resistors of which are adapted to be checked and corrected by the machine of FIG. 1.

A typical hybrid integrated circuit whose resistors may be checked and corrected by the machine of this invention is produced by starting from wafers of vitrified alumina, one of which is indicated by the reference 16 in FIG. 18. Each wafer 16, the dimensions of which are about 50 × 50 mm, constitutes the substrate for twelve chips 17 for an equal number of like integrated circuits arranged in two rows of six chips.

The conductors of each chip 17 are constituted by a deposit of a layer of nickel-chromium obtained by vaporization under vacuum and covered by a layer of gold obtained partly by vaporization under vacuum, after which the circuit elements, that is the form of the circuit, are obtained by photoetching. The thickness of the circuit elements obtained in this way is increased by a subsequent deposit of gold by electrolysis for a thickness of about 3.5 microns.

Each integrated circuit chip 17 comprises zones 18 for the connection of semiconductor elements and extensive areas 19 of nickel-chromium-gold deposit, the resistance of which is negligible, and connections for said deposit, indicated by the references R1, R2, R3, R4 . . . , which constitute the resistors true and proper of the circuit. Normally, up to twelve resistors can be provided for each chip. The value of the resistors obtained in this way is slightly less than the predetermined value, so as to be able to effect corrections of a resistor by removing part of the deposit of nickel-chromium-gold. To this end, each resistor R1, R2 . . . is provided with a step 20 disposed between two zones of different width. The deposit is removed by operating on the step 20 so as to increase the zone of smaller thickness and, therefore, increase the value of the resistor.

Figure 1:
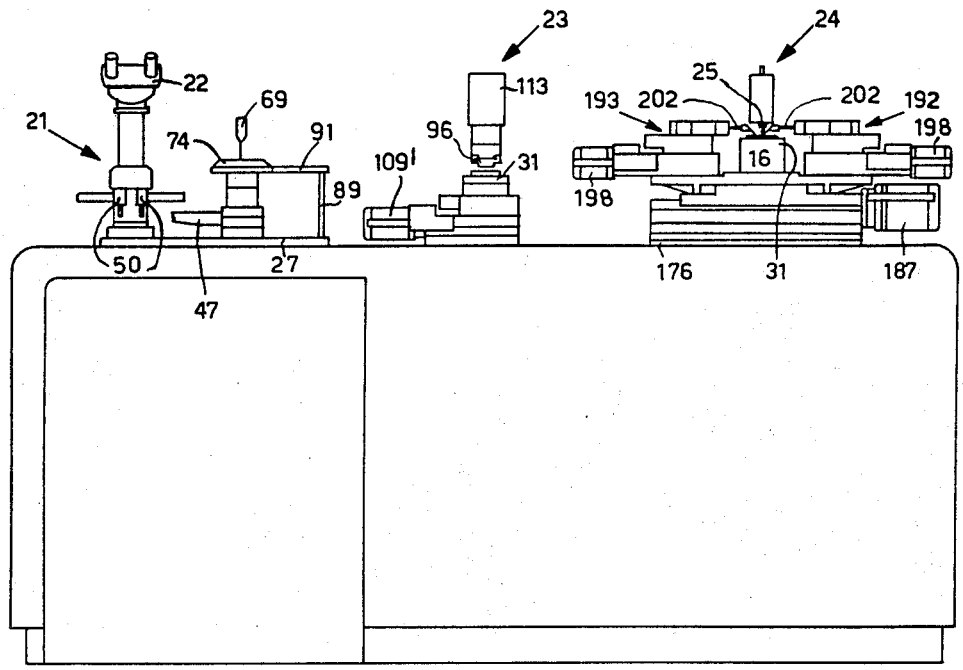
FIG. 1 is a front view of a machine according to the invention for checking and correcting the resistors of integrated circuits.

The machine for checking and correcting the resistors works on a wafer 16 containing twelve chips 17 for an equal number of integrated circuits. It comprises a first device 21 (FIG. 1) for positioning and aligning the wafter 16 on a system of pins with the aid of a two-objective microscope 22. The machine moreover comprises a second device 23 for the sequential checking of the resistors R1 . . . R12. This device determines the value of each resistor and stores information which classifies the resistors according to whether they have a tolerance or are to be corrected or are to be rejected, because they are outside the limits within which the correction can act.

The machine moreover comprises a correction device 24 which is provided with a vibrating needle or point 25 for nicking the nickel-chromium-gold deposit by electroerosion in all the resistors of the twelve circuits in succession.

The needle 25 is controlled by the stored information, skipping the correction of those resistors which are included in a chip 17 in which at least one resistor has been classified as having to be rejected, as will be seen better hereinafter.

POSITIONING AND ALIGNMENT OF THE WAFER

The positioning and aligning device 21 for the wafer 16 comprises a base plate 27 (FIG. 3) on which there are fixed two aligning pins 28 and 29. The pin 28 (FIG. 4) is of triangular cross-section, while the pin 29 is circular, but has two opposite milled zones. On the two pins 28 and 29 there is disposed a support for the plate 16, this support being indicated generally by the reference 31. The support 31 is constituted by a lower plate 32 of circular form, which is provided with two locating holes 33 (FIG. 3), these holes being alike. The plate 32 is moreover provided with a depression 34 of square form (FIG. 4) in which there is disposed an upper plate 36 (FIG. 3) cemented to the plate 32. The lower portion of the plate 36 is such as to form a chamber 37 with the depression 34. The plate 36 is provided with a group of holes 38 disposed in the form of a grating and adapted to be covered by the wafer 16. On one side of the lower plate 32 (FIG. 4) there is fixed a flexible tube 39 connected to a vacuum pump not shown in the drawings.

The wafer 16 is provided with two reference marks which must be brought into perfect alignment with two reference marks 41 carried by a transparent plate 42. This plate is fused to a bar 43 pivoted on two horizontal pins 44 of a fixed frame 45 and normally held in a low position by a leaf spring 46. The objectives 50 (FIG. 3) of the microscope 22 are disposed in such manner as to frame the two reference marks 41 (FIG. 4).

For positioning the wafer 16, there is provided an arm 47 (FIG. 3) of C-shaped cross-section which is pivoted on a horizontal shaft 48. To the free end of the arm 47 there is fixed a pin 49 on which a hub 51 integral with a bar 52 can turn. This bar carries at its two ends two blocks 53 with a high coefficient of friction, which are adapted to co-operate with the wafer 16.

The hub 51 has a groove in which there is wound a flexible cable 54 which is moreover wound in a similar groove of a hub 56 integral with a worm wheel 57, which is also rotatable on the shaft 48. The two ends of the cable 54 are connected to a spring 58 arranged between two drilled lugs 59 through which the cable 54 itself passes. The lugs 59 are fast with the arm 47 and constitute the two end-of-travel stops for the cable 54.

The shaft 48 is fixed on two projections of a first slide 61 slidable by means of balls parallel to the plane of FIG. 3 on two horizontal V-shaped guides 62 (FIG. 5). A second slide 63 is slidable perpendicularly to the slide 61 by means of balls on another two V-shaped guides 64 (FIG. 3) on a plate 66 fixed to the base plate 27.

The plate 66 is provided with a hole 67 in which there is housed a first ball joint 68 fixed to a manual actuating lever 69. This lever carries a second ball joint 71 housed in a hole 72 in the slide 61. Fixed to this slide is a sleeve 73 in which there turns by means of antifriction bearings a hollow knob 74 having its top edge milled and through which the lever 69 extends. On the bottom edge of the knob 74 there is fixed a gear 76 in mesh with a pinion 77 fast with a worm 78 rotatable on the slide 61 and in mesh with the worm wheel 57.

Fixed on the arm 47 is a pin 79 on which there is pivoted a lever 81 connected through a stud 82 to a second lever 83. The latter lever is pivoted on a pin 84 fixed to a projection 86 of the slide 61. A spring 87 is stretched between the stud 82 and a projection 88 of the slide 61. On the base 27 there are moreover fixed four columns 89 carrying a rest plate 91 for the hand of the operator who is to actuate the lever 69 and the knob 74.

To arrange a wafer 16 to be positioned on the support 31, the arm 47 is first raised by causing it to turn about the shaft 48. When the stud 82 overcomes the position of alignment with the pin 84 and the spring 87, the latter urges the arm 47 further upwardly until it causes it to bear against a shoulder 92 of the sleeve 73.

By then raising the plate 42 (FIG. 4), the support 31 is placed by means of the holes 33 on the aligning pins 28 and 29 and the wafer 16 to be aligned is arranged on the plate 36 of the support 31, being centered by sight on the plate 36. The plate 42 is then lowered again and is held in the low position by the spring 46. The arm 47 is moreover lowered again, overcoming at first the tension of the spring 87 (FIG. 3), which then holds the arm 47 itself with the two blocks 53 bearing against the wafer 16.

The operator now begins to sight the reference marks 41 of the plate 42 and the corresponding reference marks of the wafer 16, which are still displaced with respect to the reference marks 41. Moreover, the operator, resting his hand on the plate 91, actuates the lever 69 and the knob 74 which, in combination, bring the reference marks of the wafer 16 into alignment with the reference marks 41. More particularly, by acting on the knob 74, the rotation of the wafer 16 about the axis of the pin 49 is effected. In fact, the gear 76, acting through the pinion 77, causes the worm 78 to rotate correspondingly. The worm causes the worm wheel 57 to rotate around the shaft 48, as a result of which the hub 56 causes the hub 51 to rotate together with the bar 52 through the medium of the cable 54. The two blocks 53 thus carry the wafer 16 along in rotation about the pin 49.

By actuating the lever 69, on the other hand, the translation of the wafer is effected. The lever can be turned in any plane passing through the center of the ball joint 68 and causes the ball joint 71 to be shifted from time to time. The movement of this ball joint 71 is effected by means of a displacement of the slide 63 with respect to the plate 66 in accordance with the component of the movement itself in the direction of the guides 64, and a displacement of the slide 61 with respect to the slide 63 in accordance with the component of the movement in the direction of the guides 62 (FIG. 5). The arm 47, in turn, moves rigidly with the slide 61, the resultant movement of which is finally transmitted to the wafer 16.

The alignment having been carried out, the vacuum pump is actuated and, through the tube 39 (FIG. 4), creates in the chamber 37 a vacuum capable of keeping the wafer 16 fixed rigidly to the support 31 during the successive treatments.

By now raising the arm 47 and the plate 42, the support 31 is removed from the pins 28 and 29. The support 31 is then moved, together with the tube 39 which maintains the vacuum and the wafer 16 to be corrected, to the following station of the machine, that is the device 23 (FIG. 1) for sequential checking of the resistors 19.

CHECKING THE RESISTORS

The sequential checking device for the resistors comprises a base plate 93 (FIG. 6) on which there is fixed a column 94 carrying a sensing assembly indicated generally by the reference 96. The support 31 on which the wafer 16 to be checked is held is disposed on a slide assembly indicated generally by the reference 97.

More particularly, the support 31 is fixed on two pins 98 and 99 similar to the pins 28 and 29 (FIG. 3) and fixed to a plate 101 (FIG. 6). This plate is secured to a first slide 102 of the assembly 97 which is slidable in the plane of FIG. 7 on a second slide 104 by means of two ball-equipped guides 103 (FIG. 6). The second slide, in turn, is slidable perpendicularly to the slide 102 by means of two ball-equipped guides 105 (FIG. 7) on a fixed plate 106.

The slide 102 is shifted by means of a screw 107 (FIG. 6) and nut 108 through the medium of a stepping motor 109 (FIG. 7) carried by the slide 104.

Similarly, the slide 104 is shifted by means of a screw 107' and nut 108' by a second stepping motor 109' (FIG. 6) identical to the motor 109 and carried by the plate 93. On each of the slides 102 and 104 there are fixed two tubes 110 which co-operate telescopically with two holes 111 in the slide 104 and the plate 106, respectively, and each contain a spring 112 adapted to take up any play between the screw and the nut always in the same direction, as a result of which the movements of the slides 102 and 104 are very precise in every case. The slides 102 and 104 are moreover provided with projections 115, only one of which is visible in FIG. 6, which are adapted to define in known manner, for example by means of microswitches not shown in the drawing, the rest or inoperative position of the slides themselves and, therefore, the zero state of the stepping motors 109 and 109'.

The sensing assembly 96 comprises a support 113 (FIG. 7) fixed to the column 94 and which bears two V-shaped vertical guides 114 (FIG. 8) on which a testing slide 116 is slidable.

Fixed to the slide 116 is a pin 117 (FIG. 9) bearing a rotatable roller 118 which co-operates with an eccentric 119 fixed on the shaft 121 of a braked electric motor 122 (FIG. 7) known per se. The eccentric 119 is integral with a cam 123 (FIG. 9) adapted to actuate a microswitch 124, the function of which will be seen hereinafter.

The pin 117 is moreover connected to the rod 126 of a double-acting hydraulic piston 127 adapted to be actuated through two conduits 128 and 129.

A bracket 131 (FIG. 8) of substantially U-shaped form is moreover fixed to the lower part of the slide 116 (FIG. 7) in such a manner as to be adjustable in height. The two arms of the bracket 131 are provided with two prismatic guides 132 (FIG. 6) into which a measuring tool, indicated generally by the reference 133, can be inserted, the tool being constructed specifically for the wafer 16 to be checked. More particularly, the tool 133 comprises a rectangular metal frame 134 in which there is disposed a series of pairs of small plates 137 (FIG. 7) embedded in an insulating block 136 of plastic material, for example Araldite. Each plate 137 has a testing point 138 and an end 139 not covered by the Araldite and to which there is soldered a conductor not visible in the drawings. The plates 137 are arranged in a position such that the points 138 of each pair are in a position corresponding to the two ends of the resistor R1, R2 ... (FIG. 18) to be checked. The points 138 of the various pairs of plates 137 (FIG. 18) therefore reproduce the arrangement of the ends of all the resistors R1, R2 ... of a complete chip 17 of an integrated circuit of the wafer 16.

The tool 133 is inserted into the guides 132. The position of the tool 133 is adjusted by means of three eccentric dowels 151, after which the tool 133 is locked in the guides by means of two fixing screws 152 (FIG. 8).

In the inoperative state, the oil is kept under pressure in the conduit 129 (FIG. 7), as a result of which the slide 116 is held by the hydraulic cylinder 127 in the high position shown in the drawing.

After the positioning of the wafer 16 on the support 31 has been effected, the support is withdrawn together with the tube 39 from the device 21 (FIG. 2) and is placed over the pins 98 and 99 (FIG. 6) of the plate 101 of the checking device 23. The support 31 is thus positioned exactly in the correct position. The cycle of measurement of the resistors is initiated by means of a starting key not shown in the drawings. This cycle comprises a measuring operation for each chip 17 (FIG. 18), which is checked by a control circuit which will be described hereinafter.

The depression of the starting key first of all causes the flow of oil to the conduit 128, as a result of which the cylinder 127 causes the roller 118 to bear against the eccentric 119 as shown in the drawing. Moreover, the depression of the starting key causes the positioning of the slides 102 and 104 (FIG. 6) in the initial position with the aid of the projections 115. In this position, the tool 133 is disposed in correspondence with the first of the twelve chips 17 (FIG. 18).

The control circuit then causes the shaft 121 (FIG. 7) of the motor 122 to rotate through 180°. The eccentric 119 therefore allows the roller 118 to move downwardly together with the pin 117 and the slide 116. The bracket 131 then causes the points 138 to bear on the ends of the resistors R1, R2 ... (FIG. 18) of the first chip 17. Through the microswitch 124 the cam 123 then gives consent for the measurement, which is processed by the control circuit in the manner which will be seen hereinafter.

After this processing, the motor 122 (FIG. 7) is again actuated for a 180° rotation of the driving shaft 121, as a result of which the eccentric 119 brings the slide 116 back into the high position. The control circuit then commands the two stepping motors 109 and 109' (FIGS. 6 and 7) which, through the screws 107 and 107' and the nuts 108 and 108', cause the two slides 102 and 104 to shift so as to bring the wafer 16 with the second chip 17 (FIG. 18) in correspondence with the tool 133 (FIG. 7), whereby the second measuring operation is initiated.

This measuring operation is thus repeated for all the chips 17. After the measurement of the last chip, oil is delivered to the conduit 129, as a result of which the hydraulic cylinder 127 causes the slide 116 to return to the inoperative position.

The operator can then remove the support 31, together with the checked wafer 16, from the pins 98 and 99 (FIG. 6).

PREPARATION OF THE MEASURING TOOL

Figure 10:
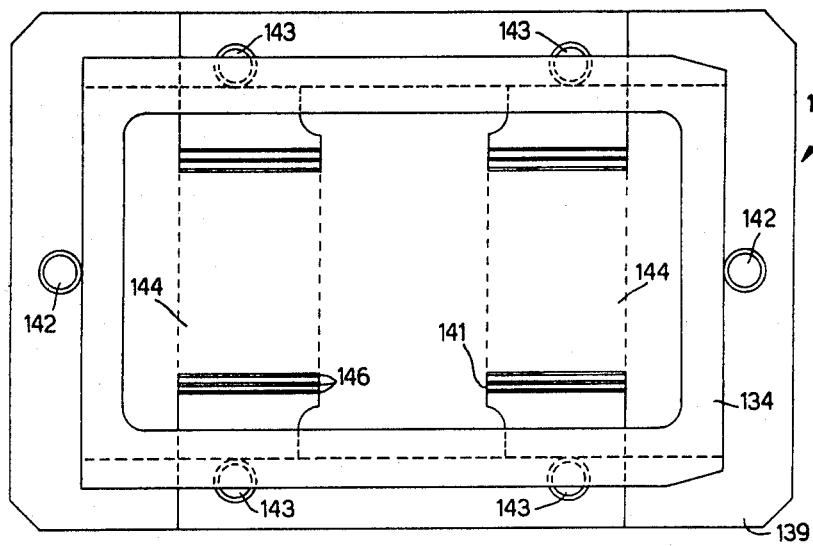
FIG. 10 is a plan view of an auxiliary device of the machine on a further enlarged scale.

The preparation of a tool 133 is effected from time to time for each type of wafer 16 with the aid of a rectangular plate 139 (FIG. 10). This plate is provided with a central hole 141 of dimensions substantially greater than those of an individual chip 17 of an integrated circuit. The plate 139 is moreover provided with two pins or dowels 142 in correspondence with the smaller sides of the plate 139 and with four pins or dowels 143 opposed in pairs in correspondence with the larger sides of the plate 139. The pins 142 and 143 are removable and serve to assist the positioning of the frame 134 of the tool 133.

Figure 12:
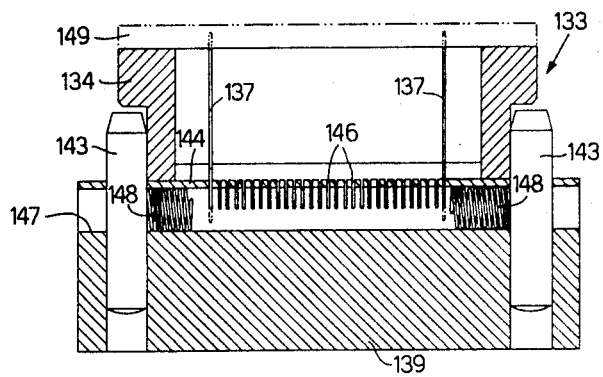

In correspondence with each pair of pins 143, the plate 139 is provided with a corresponding raised transverse portion 144. The two portions 144 are provided with a series of slots 146 (FIG. 12) adapted to accommodate the plates 137. The slots 146 are at a modular interval, for example of 0.6 mm, as a result of which there is a wide choice for the positioning of the plates 137. Through each portion 144 there moreover extends a transverse hole 147 in which there is housed a spiral spring 148 abutting the two pins 143.

Figure 11:
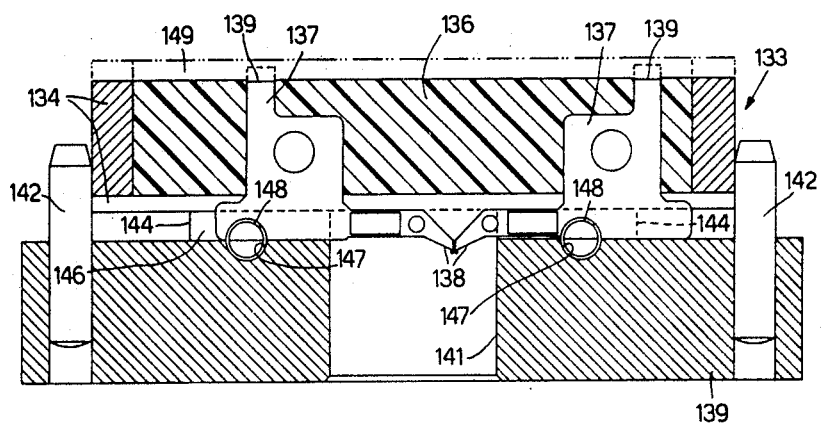
FIGS. 11 and 12 are two sections at right angles to one another of the device of FIG. 10.

In order to prepare the tool 133, a frame 134 is arranged on the plate 139 between the pins 142 and 143, being rested on the two portions 144. The plates 137 (FIG. 11) are then arranged in the slots 146 in a position such that the point 138 corresponds to the end of the respective resistor R1, R2 ... (FIG. 18) to be checked. The plates 137 (FIG. 12) are now held secure by the springs 148.

Thereafter, the assembly comprising the plate 139 and the frame 134 is inverted and the frame 134 is filled with Araldite through the hole 141 as far as the edge of the long sides of the frame 134. When the cooling of the Araldite has taken place, the frame 134 is removed with the plates 137 from the plate 139 and the top surface of the tool 133 is rectified by removing a thin layer 149 from the tool 133 itself so as to completely uncover the projections 139 of the plates 137 to which the conductors will then be soldered.

CONTROLLER FOR THE CHECKING DEVICE

The conductors soldered to the plates 137 (FIG. 7) are connected to a connector indicated diagrammetically and marked 153 in FIG. 17. The conductors of the connector 153 can be connected to a Wheatstone bridge 154 for measuring the resistors R1, R2 ... of a chip 17 through a series of switches I which can be closed in sequence. Through a second series of switches Ic, there can moreover be connected to the bridge 154 a second series of conductors connected through a connector 155 to a series of standard resistors RC1, RC2 ... RC12. The bridge 154 is controlled on the one hand by a sequencing circuit 156 adapted to close the switches I and Ic of the pairs of resistors R1, RC1; R2, RC2; etc. in sequence for each chip 17. The bridge 154 is moreover fed by a programmed feeder 157, which is also controlled by the sequencing circuit 156 so as to apply to the bridge 154, for the measuring of each resistor, a voltage of a value suited to the nominal value of the resistor itself. The dissipation in the resistors is thus minimized, whereby the measurement remains within the limits of the required sensitivity.

The sequencing circuit 156 is controlled by a programme circuit 164 adapted to programme the entire cycle of the various operations to be carried out on a wafer 16. More particularly, the circuit 164 carries out the successive command steps under the control of a signal generated by the microswitch 124 (FIG. 9) and is adapted to control a circuit 166 (FIG. 17) programming the position of the wafer 16. The circuit 166 therefore comprises a store in which there are recorded the coordinates of the twelve chips 17 (FIG. 18). Since these twelve chips 17 always occupy the same part of the wafer 16 for any circuit element, this store may be a read-only store. The pairs of coordinates of this store are read sequentially to command through a feedback circuit 167 the two stepping motors 109 and 109' for shifting the slides 102 and 104 (FIGS. 6 and 7) from one chip 17 (FIG. 18) to the other.

Figure 2:
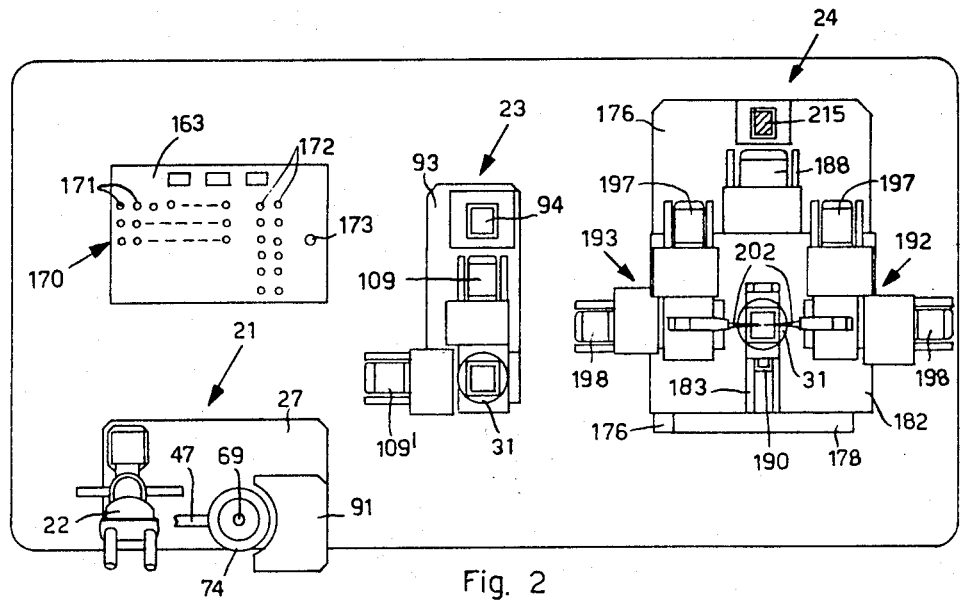
FIG. 2 is a top view of the machine of FIG. 1.

The bridge 154 (FIG. 17) is moreover connected to three comparators 158, 159 and 161 to which voltages generated by a reference-voltage generator 162 are applied. These voltages are programmed manually for all the resistors by means of setting devices disposed on a control panel 163 (FIG. 2). These setting devices enable the tolerances acceptable for each resistor to be fixed. Such tolerances may be 0.5; 1; 2 percent and at intervals of 5 from 5 to 25 percent.

For each tolerance chosen, the generator 162 (FIG. 17) generates a voltage corresponding to the upper limit of the required tolerance and applies it to the comparator 158. This is then able to signal whether the resistor measured is above or below this tolerance limit. The generator 162 moreover generates a voltage corresponding to the lower limit of the required tolerance and applies it to the comparator 159, which is then able to signal whether the resistor measured is above or below this tolerance limit. Finally, the generator 162 provides a correction voltage which is the same for all the resistors and indicates the lower limit of the resistors which can be corrected. This voltage is applied to the comparator 161, which is then able to signal whether a resistance is greater or less than the limit resistance for which it is still convenient to effect correction.

The signals generated in this way are sent to a staticizing circuit 163, from which there may issue on the basis of the combination of the three signals aforesaid for each resistor: a signal indicating that the resistor is to be corrected, or a signal indicating that the resistor is within tolerance limits, or a signal indicating that the resistor cannot be corrected or that correction is not suitable.

The signals emitted by the circuit 163 are recorded in a first core store 168 and control a circuit 169 commanding a visual display 170 of the progress and results of the measurements. More particularly, the visual display 170 is arranged on the panel 165 (FIG. 2) and comprises a set of three lamps 171 (FIG. 17) of different colors for each of the possible twelve resistors R1, R2 ... of a chip 17. Each of the three lamps 171 is lit up by one of the three signals emitted by the circuit 163, as a result of which the operator has from time to time a visual representation of the state of the resistor measured.

The visual display 170 moreover comprises a lamp 172 associated with each resistor and adapted to light up to indicate that at least one of the resistors of the circuit element is to be rejected, for which reason the entire chip 17 is to be rejected. The reject signal for a single resistor of a chip 17 erases in said store 168 any possible correction information relating to the other resistors of the same chip and causes the corresponding lamp 172 to light up.

Both the store 168 and the visual display 170 are controlled by the programming circuit 164. On the completion of the cycle of measurement of a chip 17, the programming circuit causes a different sector of the store to be affected by the staticizer and causes the twelve sets of three lamps 171 to be extinguished by prearranging the next reject lamp 172 for lighting up.

Finally, the visual display 170 comprises a lamp 173 which lights up only if, at the end of the measurement of the whole of the wafer 16 (FIG. 2), no chip 17 is to be corrected, that is some are to be rejected and others are within tolerance limit. At the end of the measurement, the operator therefore has a visual representation of the entire wafer 16. He will mark, for example with a pencil, the chips 17 to be rejected which are indicated by the lamps 172 so as to eliminate them after the cutting of the chips 17. Moreover, in the event of the lamp 173 lighting up, he will exclude the wafer 16 from the correction stage.

The time for measuring a resistor is about 200 milliseconds, while 60 seconds are needed for measuring the whole wafer 16, taking account of the positioning operations. To dissociate the measuring time from the correction time, which as will be seen hereinafter is not constant, the information contained in the store 168 at the end of the measurement is transferred, under the control of the programming circuit 164, to a correction store 174 similar to the store 168. The store 174, in turn, is adapted to control the programming circuit 164 so as to inhibit this transfer and, therefore, a fresh measuring cycle until the store 174 has been emptied.

CORRECTION OF RESISTORS

Figure 14:
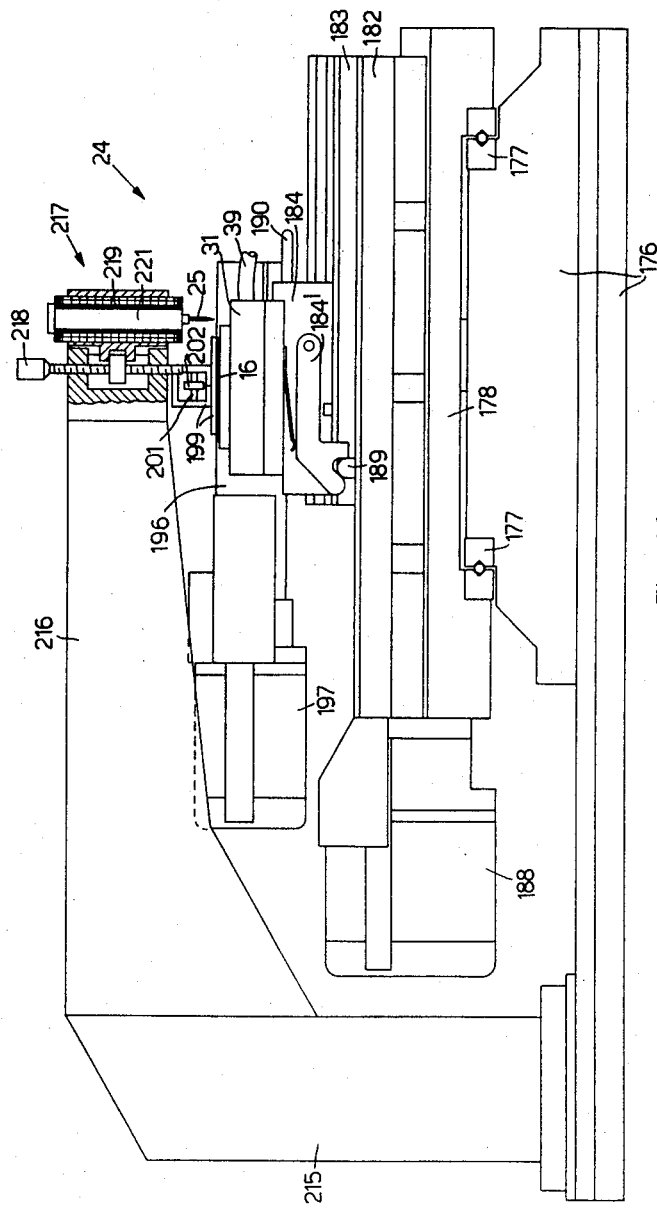
FIG. 14 is a side view of the device of FIG. 13.

The device 24 (FIG. 14) for correcting the resistors comprises a base plate 176 on which a first slide 178 is slidable on ball-equipped guides 177 in the plane of FIG. 13. On this slide there is slidable perpendicularly to the plane of FIG. 13, by means of ball-equipped guides 181, a second slide 182 bearing a block 183. This block is provided with two prismatic guides 180 on which there can slide a plate 184 equipped with two pins 185 and 186 adapted to receive the support 31 of the already measured wafer 16.

The plate 184 is provided with a handle 190 for inserting it in the guides 180 and removing it therefrom. The plate 184 is moreover provided with a spring-biased locating element 184' (FIG. 14) adapted to cooperate with a fixed stud 189 to hold the plate 184 locked in the working position of FIG. 24.

Figure 7:
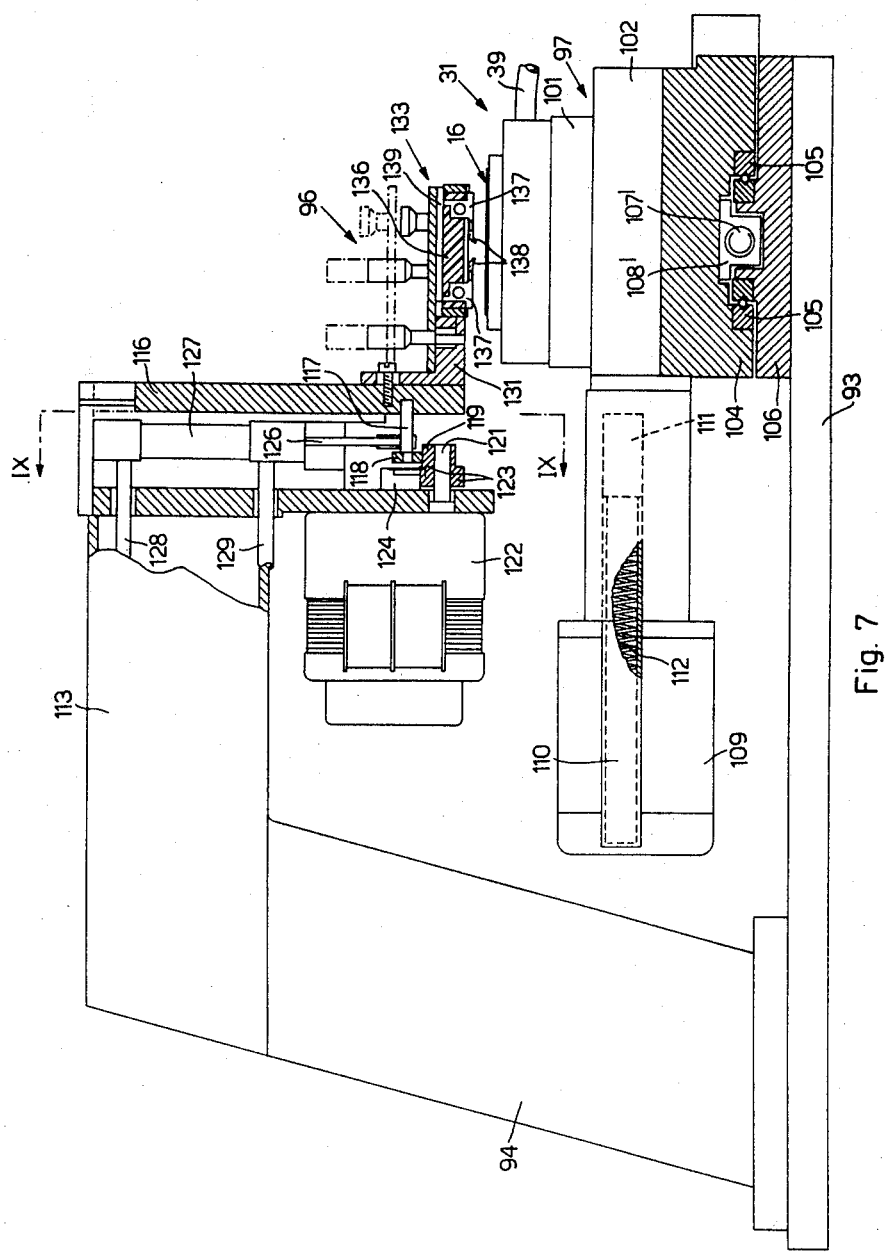
FIG. 7 is a side view of the device of FIG. 6.

The two slides 178 and 182 are moved by two corresponding electric stepping motors 187 and 188 similar to the motors 109 and 109' (FIGS. 6 and 7) and adapted to be commanded through the medium of a control circuit, as will be seen hereinafter. On the slide 182 (FIG. 15) there are moreover disposed two slide assemblies 192 and 193 each constituted by two slides 194 and 196 slidable in two directions at right angles to one another and controlled by two corresponding stepping motors 197 and 198 which are also similar to the motors 109 and 109' (FIGS. 6 and 7).

On each slide 196 there is fixed a support 199 bearing a pin 201 (FIG. 16) on which a lever 202 is fixed. To one end of the lever 202 there is fixed a testing needle 203 formed of conductive material and connected to an electric conductor 204. The other end of the lever 202 is provided with a roller 207 normally bearing through the action of a flat spring 206 against an inclined surface 208 of a bar 209. The spring 206 is adjustable by means of a screw 210. The bar 209 is fixed to a cylindrical armature 211 of an electromagnet 212 and is normally held against a stop 213 by a compression spring 214.

The correction device moreover comprises a column 215 (FIG. 14) fixed to the base plate 176 and bearing a fixed arm 216. This arm carries at its end a support 217 which is adjustable vertically by means of a screw 218. To the support 217 there is fixed an electromagnet 219 to the armature 221 of which is fixed the electroerosion needle 25. Due to the action of its own weight, the armature 221 is normally in the low position so as to bear on the wafer 16.

After the measuring stage, if the wafer 16 includes resistors which are to be corrected, the operator arranges the support 31, together with the wafer 16 still fixed thereto owing to the action of the vacuum in the tube 39, on the two pins 185 and 186 of the block 183. To this end, the operator first draws the plate 184 forward by acting on the handle 190, overcoming the spring-biased locating element 184' (FIG. 14), so as to bring the plate 184 forward with respect to the free end of the arm 216. The support 31 is then arranged on the pins 185 and 186 and, by means of the handle 190, the plate 184 is brought into the position shown in FIG. 14 together with the support 31.

The two stepping motors 187 and 188 then shift the slide 182 together with the plate 184 so as to arrange the first of the chips 17 in correspondence with the needles 25. The two pairs of stepping motors 197 and 198, in turn, cause the two pairs of slides 194 and 196 to shift so as to dispose the two testing needles 203 in correspondence with the ends of the first resistor to be corrected. The control circuit, which will be referred to hereinafter, now actuates the electroerosion needle 25 alternately at a frequency of 200 c.p.s. until the testing needles 203 signal that the value of the resistor, by increasing, has entered the range of the prescribed tolerance. The measurement of the resistance is effected by stopping at a frequency of 50 c.p.s. the electroerosion and the feed of the motors.

The stepping motors 187 and 188 are then actuated so as to bring the needle 25 in correspondence with the shoulder 20 (FIG. 18) of the second resistor R2, while the stepping motors 197 and 198 (FIG. 15) cause the testing needles 203 to move so as to bring them into correspondence with the ends of the second resistor R2 (FIG. 18), as a result of which the correction cycle recommences. In this way, the resistors of the first chip 17 are corrected, after which the correction is initiated in the second chip 17, and so on throughout the wafer 16. On the basis of the data recorded in the store 174 (FIG. 17), the correction device skips the working cycle in all the resistors R1, R2 . . . which have a tolerance and in all the resistors of the wafers 16 in which at least one resistor to be rejected has been measured, as will be seen hereinafter.

CONTROL OF THE CORRECTION DEVICE

The stepping motors 187, 188, 197 and 198 (FIG. 15) are controlled by means of a magnetic or punched tape 220 (FIG. 17) on which are recorded the coordinates of each step 20 of the resistors R1; R2 . . . and of each end of these resistors of a chip 17. The recording tape is read by a tape reader 222, which controls a position programming circuit 223 through a control circuit 225. The position programming circuit 223 moreover receives the information recorded in the store 174 so as to give consent to the movements of the slides only if the information states that the resistor is to be corrected.

Moreover, the programming circuit 223, under the control of the store 174, is adapted to add from time to time to the data read by the reader 222 a constant depending on the chip 17 to which the information relates. The programming circuit 223 therefore controls through a feedback circuit 224 the two stepping motors 187 and 188 (FIG. 15) for shifting the wafer 16 with respect to the electroerosion needle 25 and through another two feedback circuits 226 the two pairs of stepping motors 197 and 198 for shifting the two testing needles 203.

On the reading of a service character recorded on the tape 220 at the beginning of each information group relating to a resistor, the circuit 225 moreover controls a sequencing circuit 227 adapted to connect a series of standard resistors sequentially to a Wheatstone bridge 228 for measuring the resistors to be corrected during the correction itself. The bridge 228 is connected in turn to a connector 229 to which the conductors 204 of the needles 203 (FIG. 16) are connected.

When the bridge 228 detects that the resistor measured is equal to the standard resistor, it generates a signal which causes the command, through a control circuit 230, of the starting of the reader 222 for reading the coordinates relating to the following resistor. The control circuit 230 is moreover controlled by the store 174 in such manner that, if the information recorded therein relating to the same resistor states that this resistor is not to be corrected, the reader 222 initiates at the end of the reading the reading of the coordinates relating to the following resistor, as a result of which all the operations relating to the resistors which are not to be corrected in a chip 17 are skipped in this way. The information in the store 174 that there are no resistors to be corrected in a chip 17 causes the introduction of the constant relating to that chip to be skipped, as a result of which the operations of correction of the entire chip 17 are skipped.

After the position programming circuit 223 has ascertained through the circuits 224 and 226 that all the slides 178, 182 and 194, 196 have reached the desired position, it controls on the one hand a circuit 231 commanding the energization of the electromagnet 212 (FIG. 17) for actuation of the testing needles 203, and on the other hand a circuit 232 commanding the actuation of the electroerosion needle 25. More particularly, the circuit 232 commands a circuit 233 feeding the coil 219 (FIG. 14), so that this coil causes the armature 221 and, therefore, the needle 25 to vibrate repeatedly.

The programming circuit 223 is finally adapted to control a sequencing circuit 234 adapted to activate alternately at a frequency of 200 c.p.s. the bridge 228 and a circuit 235 supplying the needle 25, which is effected by connecting the latter to a high voltage source. The programming circuit 223 therefore commands substantially simultaneously the actuation of the testing needles 203, the coil 219 and the sequencing circuit 234, as a result of which the measurements carried out by the bridge 228 and the correction effected by the needle 25 alternate on the positioned resistor until the bridge 228 signals that the corrected resistor has reached the predetermined limit, after which the bridge 228 causes a fresh cycle of the reader 222 to start through the controller 230.

It is therefore obvious that the correction of the resistors is continuously controlled by the measuring means 202, 228 and that the correction is limited exclusively to those resistors which are outside the tolerance, while it is excluded for all those chips in which at least one resistor is to be rejected, as a result of which the machine is adapted to attain a very high output.

It is understood that various modifications, improvements and additions and removals of parts may be made in the machine that has been described without departing from the scope of the invention.

We claim:

1. A machine for checking and trimming resistors of hybrid integrated circuits produced by deposition of thin films on supporting wafers, comprising trimming means for removing part of the thin film to effect the trimming, measuring means comprising a Wheatstone bridge connected to a pair of testing needles applied to the ends of the resistor to be trimmed to effect a measurement of its electric resistance, control means responsive to said measurement by said measuring means for controlling the actuation of said trimming means, a measurement and trimming sequencing circuit to alternate the operation of said trimming means and said measuring means on the resistor being trimmed, whereby each elementary trimming action is immediately checked by said Wheatstone bridge, a pair of levers for carrying said needles, a pair or electromagnets energizable for causing each one of said levers to touch the needle carried thereby to the corresponding end of the resistor, and slidable elements connected to the armature of each of said electromagnets, each of said slidable elements having an inclined surface acting on one of said levers to adjust the position of the needle relative to the end of the resistor in response to signals of said electromagnet.

2. A machine as claimed in claim 1, characterized in that said trimming means comprise a trimming needle acting by electroerosion and a coil to cause said trimming needle to vibrate continuously, said sequencing circuit including means for controlling the intermittent supply of the electroerosion voltage to said coil.

3. A machine as claimed in claim 2, wherein each resistor comprises a thin film forming a step, said electroerosion needle acting on said step, said resistor and said electroerosion needle being movable one with respect to the other so as to cause said needle to advance progressively in a direction perpendicular to said step.

4. A machine for checking and trimming resistors of hybrid integrated circuits produced by deposition of thin films on supporting wafers, the resistors to be trimmed being aligned in predetermined positions on a support, said resistors having a thin film forming a step, comprising measuring means including a pair of testing needles applied to the ends of the resistor to be trimmed to effect measurement of its resistance, trimming means including an electroerosion needle acting by electroerosion on said step for removing part of the thin film to effect the trimming and a coil to cause said electroerosion needle to vibrate continuously, a measurement and trimming sequencing circuit to alternate the operation of said measuring means and said trimming means on the resistor being corrected, said sequencing circuit including means for controlling the intermittent supply of electroerosion voltage to said coil, first means for shifting said electroerosion needle indirectly with respect to said support, and second means for shifting said testing needles intermittently and individually with respect to said support, said first and second shifting means being actuated on the basis of the recorded coordinates of said step and of said ends.

5. A machine as claimed in claim 4, characterized in that said first shifting means comprise a first pair of slides movable in two directions at right angles to one another by means of two stepping motors and carrying said support, said second shifting means being carried by one of said slides and comprising two further pairs of slides, each pair bearing one of said testing needles, said pairs of slides being movable in two directions at right angles to one another by means of corresponding stepping motors.

6. A machine as claimed in claim 5, wherein said measuring means comprises a Wheatstone bridge connected to said testing needles, said bridge comparing the trimmed resistor with a standard resistor and including a tape carrying said coordinate information and a tape reader for reading the coordinates of the next of said resistors to be trimmed in response to said bridge detecting substantial equality between said trimmed resistor and said standard resistor.

7. A machine as claimed in claim 6, characterized in that said reader commands the actuation of one of the stepping motors of said first pair of slides in response to a further piece of information recorded on said tape.

8. A machine as claimed in claim 6, including a resistor sequencing circuit connecting said standard resistor corresponding to the resistor to be trimmed to said bridge from time to time in response to commands from said reader.

9. A machine as claimed in claim 6 including a programming circuit responsive to said reader for commanding the actuation of said electromagnets, said coil and said measuring and trimming sequencing circuit.

10. A machine as claimed in claim 6, characterized in that it checks and trims in one cycle the resistors of a plurality of like circuit chips located on a single wafer, means being provided for adding to the information read on said tape from time to time a constant indicating the position of the chip to be trimmed.

11. A machine for checking and trimming resistors of hybrid integrated circuits produced by deposition of thin films on supporting wafers, comprising trimming means for removing part of the thin film to effect the trimming, measuring means including a Wheatstone bridge connected to a pair of testing needles applied to the ends of the resistor to be trimmed to effect a measurement of its electric resistance, control means responsive to said measurement by said measuring means for controlling the actuation of said trimming means, a measurement and trimming sequencing circuit to alternate the operation of said trimming means and said measuring means on the resistor being trimmed, whereby each elementary trimming action is immediately checked by said Wheatstone bridge, including a checking device to measure the resistance of the resistors to be trimmed and store means for storing said individual resistances before the trimming operation, said checking device comprising a testing tool provided with a plurality of pairs of points and adapted to test all the resistors of a circuit simultaneously, and said machine including an electronic sequencing circuit means coupled between said pairs of points and said store means for commanding the sequential measurement of the resistances of said resistors and the sequential recording of said resistances in said store.

12. A machine as claimed in claim 11, including a second Wheatstone bridge for measuring the resistances of said resistors, said sequential circuit connecting from time to time to said second bridge a resistor to be checked and a corresponding standard resistor from a series of standard resistors.

13. A machine as claimed in claim 12, including a supply circuit programmed in such manner and controlled by said sequencing circuit so as to supply said second bridge with a voltage such as to allow the bridge to measure with a substantially constant sensitivity.

14. A machine as claimed in claim 12, characterized in that said second bridge is connected to a set of three comparators fed by a voltage generator generating a first voltage corresponding to the upper limit of the tolerance desired for a given resistor for a first of said comparators, a second voltage corresponding to the lower limit of the tolerance desired for a given resistor for a second of said comparators, and a third voltage corresponding to the minimum limit of the resistance at which it is desired to effect a trimming for a third of said comparators.

15. A machine as claimed in claim 14, characterized in that said voltage generator is controller by said sequencing circuit, said first, second and third voltages being settable manually.

16. A machine as claimed in claim 14 characterized in that a staticizing circuit records a trimming signal, or a reject signal or an acceptance signal in said store for each resistor on the basis of the combination of the comparison signals emitted by said comparators.

17. A machine as claimed in claim 16, characterized in that staticizing circuit moreover controls a visual display in response to said comparison signals indicating the condition of a complete ship.

18. A machine as claimed in claim 17 characterized in that at the end of the measurement said store erases the recording of a complete chip in response to one or more reject signals for resistors on that chip.

19. A machine as claimed in claim 18, said resistor comprising a thin film forming a step, said trimming means comprising an electroerosion needle acting by electroerosion on said step, said resistor and said electroerosion needle being movable one with respect to the other so as to cause said needle to advance progressively in a direction perpendicular to said step, the resistors to be trimmed being aligned in predetermined positions on the support, said machine including first means for shifting said electroerosion needle indirectly with respect to said support, and second means for shifting said testing needles intermittently and individually with respect to said support, said first and second shifting means being actuated on the basis of the recorded coordinates of said step and of said ends, said first shifting means comprising a first pair of slides movable in two directions at right angles to one another by means of two stepping motors and carrying said support, said second shifting means being carried by one of said slides of said first shifting means and comprising two further pairs of slides, each pair bearing one of said testing needles, said pair of slides being movable in two directions at right angles to one another by means of corresponding stepping motors, said bridge comparing the trimmed resistor with a standard resistor and including a tape carrying said coordinate information and a tape reader for reading the coordinates of the next of said resistors to be trimmed in response to said bridge detecting substantial equality between said trimmed resistor and said standard resistor, said machine checking and trimming in one cycle the resistors of a plurality of like circuit chips located on a single wafer, means being provided for adding to the information read on said tape from time to time a constant indicating the position of the chip to be trimmed, and wherein said visual display means comprises means for indicating the chips to be rejected and means for indicating that no chip of a wafer is to be trimmed.

20. A machine as claimed in claim 19 wherein said wafer is mounted on a support disposed over said first pair of slides movable in two directions and commanded by a program read by said tape reader to present the chips on said wafer to said tool.

21. A machine as claimed in claim 20 wherein said support is hollow and includes a connection to a source of vacuum to hold said wafer adhering to said support, and including a device for aligning said wafer on said support.

22. A machine as claimed in claim 21, characterized in that said aligning device comprises an arm having friction surfaces thereon to translate said wafer and turn it through friction under manual control.

23. A machine as claimed in claim 11, characterized in that said tool is mounted on a slide movable to bring said points into contact from time to time with the ends of said resistors.

24. A machine for checking and correcting parameters of elements of hybrid integrated circuits, wherein a plurality of similar circuits are produced by deposition of thin films of wafers obtained from a single support plate, comprising correction means for removing part of the thin film to effect correction of said elements, measuring means for measuring the parameters of the element to be corrected and for controlling the actuation of said correction means, displacing means for displacing said correction means and said measuring means with respect to each of said wafers, a checking device to measure the parameters of the elements to be corrected, and store means for storing said elemental parameters before the correction operation, said checking device comprising a testing tool provided with a plurality of pairs of points and adapted to test all the resistors of one of said circuits simultaneously, said machine including an electronic sequencing circuit means coupled between said pairs of points and said store means for commanding the sequential measurement of the parameters of said resistors and the sequential recording of said parameters in said store, said displacing means being operable in response to the elemental parameters recorded in said store, said parameters including the coordinates of each element to be corrected on each of said wafers.

* * * * *